Patented Mar. 10, 1931

1,795,764

UNITED STATES PATENT OFFICE

EMILE DE STUBNER, OF NEWARK, NEW JERSEY

PIGMENTED OR COLORED SOLUBLE CELLULOSE AND PROCESS OF MAKING THE SAME

No Drawing. Original application filed September 23, 1926, Serial No. 137,362. Divided and this application filed June 7, 1927. Serial No. 197,238.

This invention relates to the coloring or pigmentation of soluble cellulose in fibrous form, such as cellulose esters (nitro-cellulose, acetyl-cellulose), cellulose ethers (ethyl-cellulose), and the like, for use in making colored products, such for instance as lacquers, lacquer-enamels, colored celluloid, artificial leather, colored leather dopes, etc., and the invention consists of colored or pigmented soluble cellulose in fibrous form as an improved article of manufacture, and also of the process for producing the same.

The manner of carrying out the improved process and the characteristics of the improved article will be described in detail in the specification to follow, and the novel features thereof will be pointed out in the appended claims.

The color may be imparted to the soluble cellulose in various ways, such for instance as by precipitating the pigment or color on the fibers thereof by a chemical reaction between solutions of the appropriate constituents to give the desired color; by precipitation induced by the action of a gaseous fluid on a solution containing one or more of the components of the desired precipitate; by treating the cellulose in a bath containing prior formed pigments in suspension or in colloidal dispersion or in true solution, whereby the cellulose will act to filter or strain out the coloring medium which will adhere to the fibers and color the cellulose; by treatment of the cellulose with a gaseous fluid such as air containing the coloring medium in suspension; and by other means which will occur to the skilled chemist, and which are not necessary to enumerate herein.

I prefer to apply the color to the cellulose by chemical precipitation, as I have found this method to answer to a satisfactory degree the ends to be attained, and to result in the formation of a colored or pigmented soluble cellulose possessing the improved features and characteristics of my invention in the most efficient and satisfactory form, and I will now describe the method of procedure to be followed out in bringing about this application of the coloring medium to give the cellulose for instance a yellow color, although it will be understood that other colors may be imparted by employing solutions containing the appropriate ingredients for forming precipitates of such other colors.

In a tank containing about 100 lbs. of acetate of lead in solution of 2 to 5% strength, I place about 200 lbs. of washed soluble fibrous cellulose, and I introduce into the mixture about 18 lbs. of potassium bichromate in solution of 2 to 5% strength and 12 lbs. sulfuric acid (66° Bé.). As a result of the reaction of the solutions on each other, a yellow precipitate of lead chromate will be formed which will settle down on the cellulose fibers and thereby impart a yellow color to the same. The colored cellulose is now dehydrated with a suitable dehydrating agent, such as alcohol, and the dehydrating action is regulated so that the resulting improved cellulose will preferably be damp with the dehydrating agent. This completes the production of the pigmented soluble cellulose, and the product in this pigmented fibrous form may be placed on the market as a commercial product so that it may be dissolved by the merchant in a suitable solvent to form yellow lacquer, a suitable solvent for such purpose being butyl-acetate.

This same pigmented soluble cellulose may also be employed for making colored celluloid, artificial leather, etc., by incorporating the same by the use of suitable solvents in the material or article to be produced.

It is obvious that the same method of procedure may be carried out in applying to the fibrous cellulose, metal precipitates, such as copper, silver, antimony, gold, etc. For instance, in producing a precipitate of copper on the cellulose, there is placed in a suitable tank, together with 100 lbs. of soluble cellulose, a solution of copper sulfate in the proportions of 100 gallons of water to 25 lbs. of copper sulfate, and there is placed in this solution a metal precipitating agent, for example 4½ lbs. of very fine iron filings or 5¼ lbs. of zinc dust and from the reaction resulting a copper precipitate will be thrown down on the cellulose fibers, thereby imparting a copper color to the same; and the colored cellulose will be treated with a suitable dehydrating agent as in the first instance described.

By treating the cellulose to be colored in precipitate forming solutions as hereinbefore described, the precipitate will settle directly on and attach itself to the fibers of the cellulose as a superficial coating in an exceedingly high degree of fineness, and this without resorting to the laborious, expensive, and time-consuming drying and grinding treatments which have been heretofore necessary in producing colored products. Under the practice heretofore carried out in making pigmented precipitates and incorporating the same in the materials or products to be colored, there are mixed together solutions of the appropriate constituents to form the color desired, and the colored precipitate is separated from the solution by filtration or by a centrifuge or similar means, leaving the precipitate in the form of a sludge or filter cake. This sludge is placed in heating ovens through which a large volume of air is blown in order to carry off the moisture, and the pigment is left in dry chunks, which are often baked together according to the temperature maintained in the drying process. These chunks are now powdered in reducing mills, such as pebble mills, cone mills, and the like, and the powdered pigment is subjected to frequent siftings in order to bring about uniformity in the marketed product. In incorporating this dry color-powder or pigment in the products or materials to be colored, such for instance as in a lacquer to color the same, the pigment is introduced into the lacquer and subjected therein to a grinding and mixing operation, in most cases occupying a period of forty-eight hours or more, in order to bring about that degree of fineness and intermixture of the materials which will produce a smooth colored lacquer free from particles or lumps of the pigmented precipitate. The steps in the above described procedure of drying the filter sludge and thereby forming a cake or lump, the grinding of this dry cake or lump to make it fine, and the further grinding and long continued intermixing of the fine pigment powder in the material or vehicle of the product to be colored, consumes much time and labor and results in correspondingly great expense. Under this previous practice the aim of which is to ultimately bring about a subdivision of the pigment of the maximum fineness, the original fineness which was brought about in the precipitating action is destroyed by the drying and the formation of the sluge into cakes, and necessitates in restoring the former condition of fineness, the expensive and time-consuming steps and the drying and grinding treatments above referred to.

In accordance with the present invention, as hereinbefore described, the precipitate or color is applied to the fibers of the soluble cellulose directly upon precipitation, and in the condition of its exceedingly fine precipitated form, whereby I am enabled to dispense with the formation of the filter sludge into cakes, its drying and subsequent grinding to break up the chunks, and the further grinding to incorporate it in the material to be colored.

In applying the coloring medium to the cellulose by precipitation induced by the action of a gaseous fluid as hereinbefore referred to, to give black for instance, 100 lbs. of soluble fibrous cellulose is steeped in a concentrated solution of acetate of lead, the solution being made up of 100 lbs. of water and 50 lbs. of acetate of lead. By means of a press this steeped cellulose is subjected to pressure to such degree that there will be left in the mass enough lead acetate liquor to contain 25 pounds of actetate of lead. This whole mass is now placed in a wooden tank the bottom of which is a perforated lead pipe connected with a cylinder containing sulfuretted hydrogen gas and provided with a controlling valve. The cylinder is placed on a weighing scale and the controlling valve is left open until 2¼ lbs. of the gas has escaped through the perforated pipe, whereupon the valve is closed. Or the soluble cellulose may be steeped in the vat of indigo and then exposed to air or oxygen with the result that a blue precipitate of indigo will be thrown down on the cellulose fibers.

In applying prior formed pigments to fibrous cellulose where the color of pigment is held in suspension or in colloidal dispersion as hereinbefore referred to, in order for instance to obtain a blue color, 100 lbs. of ultramarine is placed in 15 gallons of water with the result that a portion of it will become suspended and a portion will become colloidally dispersed or dissolved. To deposit the ultramarine of this mixture on fibrous soluble cellulose, 50 lbs. of said soluble cellulose is steeped in a solution of 10 gallons of water and 12 lbs. of aluminium sulfate and the aluminium sulfate is converted into aluminium hydrate by the addition to the steeping solution of 12 lbs. of ammonia water of 14% strength. The ultramarine mixture is now added to the cellulose carrying the aluminium hydrate, thereby causing the deposit of the ultramarine on the soluble fibrous cellulose.

It should be explained in this connection that prior formed pigments, when dispersed in water, very often form colloidal solutions, such as ultramarine or zinc sulfide, a component of lithophone, and the depositing of colloids of such pigments upon the soluble cellulose is greatly facilitated by the deposition upon the soluble fibrous cellulose of a precipitate of the opposite electric sign to that of the desired colloid. For example, ultramarine forms with water a colloidal solution, but since it is negatively electrically charged and the soluble cellulose is also negatively electrically charged, the colloid will not be deposited on the cellulose. If however the small amount of aluminium hydrate mentioned which is positively charged, is deposited on the cellulose, colloidal ultramarine will be readily deposited upon the cellulose fibers. Hydrates of other metals such as iron, copper, cadmium, etc., may serve as the precipitate inducing medium to deposit on the cellulose sulfides of antimony, lead, zinc (lithophone), etc. Also colloidal metals as such may by this method be deposited on soluble cellulose. For example colloidal silver, gold, or platinum which are negatively charged may by the aid of titanic acid, or albumen, or agar, be caused to become positively charged and thereby be precipitated on the fibers of the negatively charged cellulose.

Furthermore, acid dyes which are negatively charged may by means of mordants such as metal hydrates which are positively charged, be caused to be deposited on the negatively charged cellulose fibers. By such methods, I am enabled to apply to soluble cellulose, pigments such as lamp-black, carbon-black, bone-black, zinc oxide, lithophone, white lead, ultramarine, vermilion, Prussian blue, zinc yellow, lead chromates, chromium oxides, red lead, sulfur and vat colors, and lakes.

It is quite possible that the fluid in which the pigment is suspended may be a gas, for example air, and in the manufacture of lamp-black or zinc oxide such is the case. Such gas or air containing the pigment in suspension as lamp-black or zinc oxide, may be sprayed on or forced through soluble cellulose and thus the pigment caused to be filtered out by the cellulose and left deposited on the fibers thereof.

From the foregoing description of the manner of carrying out my improved process in respect to the application of the pigment to the fibrous cellulose, and from the description of the product resulting from said process, it will be understood that the pigment in its wetted condition on the cellulose is in the form of a pulp, in which the pigment is in a state of subdivision comparable in fineness to a precipitate of said pigment, and that in this form the pigment is distributed loosely on and among the fibers of the cellulose, which together with the pigment is left wetted with a pulping medium. This medium is, as in one of the examples given, specifically alcohol, which acts both as a dehydrator to remove the water from the cellulose and the pigment pulp, and as a pulping medium to preserve the pulpy condition of the pigment. Due to the method of applying the pigment pulp to the cellulose and to the treatment of the same thereafter, the fine, precipitate-like form of the pigment pulp is never destroyed, nor is it ever allowed to agglomerate, and by storing the pigmented cellulose, wet with a pulping medium, in sealed containers to prevent the loss of the pulping medium, the cellulose and applied pigment pulp is preserved in damp form, and the pigment is adapted, when the cellulose is dissolved in incorporating the same in the product to be colored, to become dispersed in the solution without it being necessary to subject the pigment to the customary grinding or similar dispersing treatments.

Having thus described my invention, what I claim is:

1. The process of making pigmented cellulose, which consists in depositing on soluble fibrous cellulose, pigment pulp in a state of subdivision comparable in fineness to a precipitate of said pigment, treating the cellulose and deposited pigment pulp with a liquid medium miscible with water to dehydrate them, and controlling the dehydrating treatment to leave a sufficient amount of said medium to preserve the fibrous form of the cellulose, and the pulp form of the pigment in said state of fine subdivision; whereby the fine, precipitate-like form of the pigment is maintained, and it is adapted when the cellulose is dissolved, to become dispersed in the solution without being subjected to grinding or similar dispersing treatments.

2. The process defined in claim 1, characterized by the fact that the dehydrating medium employed has no chemical affinity for the cellulose nor for the pigment.

3. The process defined in claim 1, characterized by the fact that the dehydrating medium employed is miscible with the product to be colored.

4. The process defined in claim 1, characterized by the fact that alcohol is employed as the dehydrating medium.

5. The process of making pigmented cellulose, which consists in depositing on soluble fibrous cellulose, pigment pulp in the form of a precipitate, treating the cellulose and deposited pigment pulp with a liquid medium miscible with water to dehydrate them, and controlling the dehydrating treatment to leave a sufficient amount of said medium to preserve the fibrous form of the cellulose, and the pulp form of the pigment in its state of fine subdivision; whereby the fine precipitate form of the pigment is maintained, and it is adapted when the cellulose is dissolved, to become dispersed in the solution without being subjected to grinding or similar dispersing treatments.

6. The process of making pigmented cellulose, which consists in subjecting soluble fibrous cellulose to the action of a mixture of solutions of appropriate constituents to produce on the cellulose a pigment pulp precipitate of the desired color, washing the cellulose and deposited precipitate with water, removing the excess of water, treating the cellulose and precipitate after such removal, with a liquid medium miscible with water to dehydrate them, and controlling the dehydrating treatment to leave a sufficient amount of said medium present to preserve the fibrous form of the cellulose, and the pulp form of the pigment in its state of fine subdivision; whereby the fine, precipitate form of the pigment is maintained, and it is adapted when the cellulose is dissolved, to become dispersed in the solution without being subjected to grinding or similar dispersing treatments.

7. The process of making yellow cellulose, which consists in providing a bath of a solution of acetate of lead, placing in said bath soluble fibrous cellulose, mixing with the same potassium bicromate and sulphuric acid, thereby precipitating a yellow pigment pulp on the cellulose, washing the same with water, removing the excess of water, treating the cellulose and pigment pulp after such removal with a liquid medium miscible with water to dehydrate them, and controlling the dehydrating treatment to leave a sufficient amount of said medium to preserve the fibrous form of the cellulose, and the pulp form of the pigment in its state of fine subdivision; whereby the pigment is adapted when the cellulose is dissolved, to become dispersed in the solution without being subjected to grinding or similar dispersing treatments.

8. The process of making pigmental cellulose, which consists in subjecting soluble fibrous cellulose to the action of a solution of a metal compound in the presence of a metal precipitating agent, thereby to deposit a metal pulp precipitate upon the cellulose, washing the cellulose and metal precipitate pulp with water, removing the excess of water, treating the cellulose and deposited pulp after such removal, with a liquid medium miscible with water to dehydrate the same, and controlling the dehydrating treatment to leave a sufficient amount of said medium present to preserve the fibrous form of the cellulose and the pulp form of the precipitate; whereby the fine precipitate form of the pigment is maintained, and it is adapted when the cellulose is dissolved, to become dispersed in the solution without being subjected to grinding or similar dispersing treatments.

9. The process of making pigmental cellulose, which consists in applying to soluble fibrous cellulose, pigment pulp in a state of subdivision comparable in fineness to a precipitate of said pigment, treating the cellulose and adhering pigment pulp to dehydrate the same and leave them wet with a liquid pulping medium to preserve the pulp form of the pigment in its state of fine subdivision, and storing the same in sealed containers to prevent loss of the pulping medium; whereby the fine precipitate-like form of the pigment is maintained, and it is adapted when the cellulose is dissolved, to become dispersed in the solution without being subjected to grinding or similar dispersing treatments.

In testimony whereof, I have affixed my signature hereto.

EMILE DE STUBNER.